(12) United States Patent
Volvovski et al.

(10) Patent No.: US 10,304,096 B2
(45) Date of Patent: May 28, 2019

(54) RENTING A PIPE TO A STORAGE SYSTEM

(71) Applicant: International Business Machines Corporation, Armonk, NY (US)

(72) Inventors: Ilya Volvovski, Chicago, IL (US); S. Christopher Gladwin, Chicago, IL (US); Gary W. Grube, Barrington Hills, IL (US); Timothy W. Markison, Mesa, AZ (US); Jason K. Resch, Chicago, IL (US); Thomas F. Shirley, Jr., Wauwatosa, WI (US); Greg R. Dhuse, Chicago, IL (US); Manish Motwani, Chicago, IL (US); Andrew D. Baptist, Mt. Pleasant, WI (US); Wesley B. Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 15/675,564

(22) Filed: Aug. 11, 2017

(65) Prior Publication Data
US 2017/0364972 A1 Dec. 21, 2017

Related U.S. Application Data

(63) Continuation-in-part of application No. 14/468,731, filed on Aug. 26, 2014, now Pat. No. 9,781,208.
(Continued)

(51) Int. Cl.
*G06Q 30/04* (2012.01)
*G06Q 30/02* (2012.01)
(Continued)

(52) U.S. Cl.
CPC ......... *G06Q 30/04* (2013.01); *G06F 21/6245* (2013.01); *G06Q 30/0283* (2013.01);
(Continued)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Natisha D Cox
(74) *Attorney, Agent, or Firm* — Garlick & Markison; Timothy W. Markison; Shayne X. Short (57) ABSTRACT

A computing device that includes an interface, a memory, and a processing module receives a data access request from a requesting computing device and processes them to produce a set of distributed storage (DS) access requests. The computing device then transmits the set of DS access requests to a set of storage units (SUs) via a DSN connection that is between the computing device and the set of SUs and monitors the DSN connection to generate utilization information. The computing device then receives a set of DS access responses from the set of SUs via the DSN connection and monitors the DSN connection to generate updated utilization information. The computing device then transmits a data access response to the requesting computing device and generates billing information based on at least one of the updated utilization information associated with the DSN connection, a level of billing, and a billing rate.

20 Claims, 6 Drawing Sheets

Related U.S. Application Data (60) Provisional application No. 61/898,934, filed on Nov. 1, 2013.

(51) Int. Cl.
| | | |
|---|---|---|
| *G06F 21/62* | (2013.01) | |
| *H04L 29/08* | (2006.01) | |
| *H04N 7/173* | (2011.01) | |
| *H04L 29/06* | (2006.01) | |

(52) U.S. Cl.
CPC ..... *H04L 67/1097* (2013.01); *H04N 7/17336* (2013.01); *G06F 21/6218* (2013.01); *H04L 63/0823* (2013.01); *H04L 63/101* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,509,322 | B2 | 3/2009 | Miloushev et al. |
| 7,636,724 | B2 | 12/2009 | de la Torre et al. |
| 8,630,987 | B2 | 1/2014 | Dhuse |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0191841 | A1* | 10/2003 | DeFerranti ............. H04L 12/14 709/226 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0064562 | A1 | 3/2006 | Mohideen et al. |
| 2006/0136448 | A1 | 6/2006 | Cialini et al. |
| 2006/0156059 | A1 | 7/2006 | Kitamura |
| 2006/0218435 | A1 | 9/2006 | van Ingen et al. |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0287200 | A1 | 11/2010 | Dhuse |
| 2010/0332751 | A1 | 12/2010 | Quigley et al. |
| 2011/0029524 | A1 | 2/2011 | Baptist et al. |
| 2011/0055661 | A1 | 3/2011 | Grube et al. |
| 2011/0071988 | A1 | 3/2011 | Resch et al. |
| 2011/0311051 | A1 | 12/2011 | Resch et al. |
| 2011/0314355 | A1 | 12/2011 | Grube et al. |
| 2013/0132702 | A1 | 5/2013 | Patel et al. |
| 2014/0199962 | A1* | 7/2014 | Mohammed .......... H04M 15/70 455/406 |
| 2014/0250281 | A1 | 9/2014 | Rao et al. |
| 2015/0127699 | A1* | 5/2015 | Leggette ............. H04L 67/1097 709/201 |
| 2015/0181415 | A1* | 6/2015 | Raleigh .................. H04W 8/22 455/418 |
| 2017/0286518 | A1* | 10/2017 | Horowitz .......... G06F 17/30371 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

FIG. 1
distributed, or dispersed, storage network (DSN) 10

RENTING A PIPE TO A STORAGE SYSTEM

CROSS REFERENCE TO RELATED PATENTS

The present U.S. Utility patent application claims priority pursuant to 35 U.S.C. § 120, as a continuation-in-part (CIP) of U.S. Utility patent application Ser. No. 14/468,731, entitled "OBTAINING DISPERSED STORAGE NETWORK SYSTEM REGISTRY INFORMATION," filed Aug. 26, 2014, which claims priority pursuant to 35 U.S.C. § 119(e) to U.S. Provisional Application No. 61/898,934, entitled "UPDATING REGISTRY INFORMATION OF A DISPERSED STORAGE NETWORK," filed Nov. 1, 2013, both of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide adequate means by which effective revenue metering and billing related information may be generated. Many prior art solutions provide such information tracking based on which data belongs to which users. There exists significant room for improvement in the art of data storage systems to generate such revenue metering and billing related information.

DETAILED DESCRIPTION OF THE INVENTION

Figure 1:
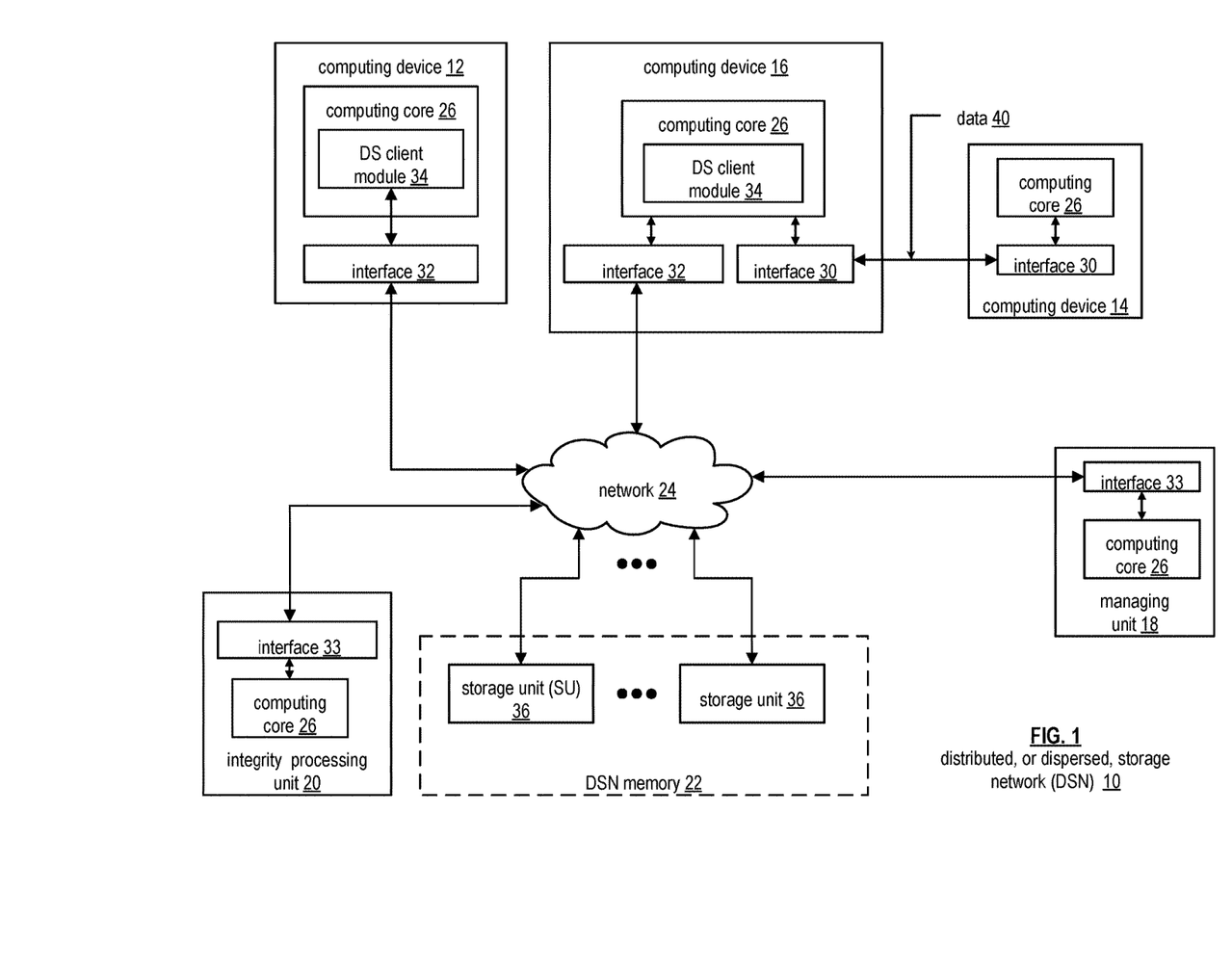
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
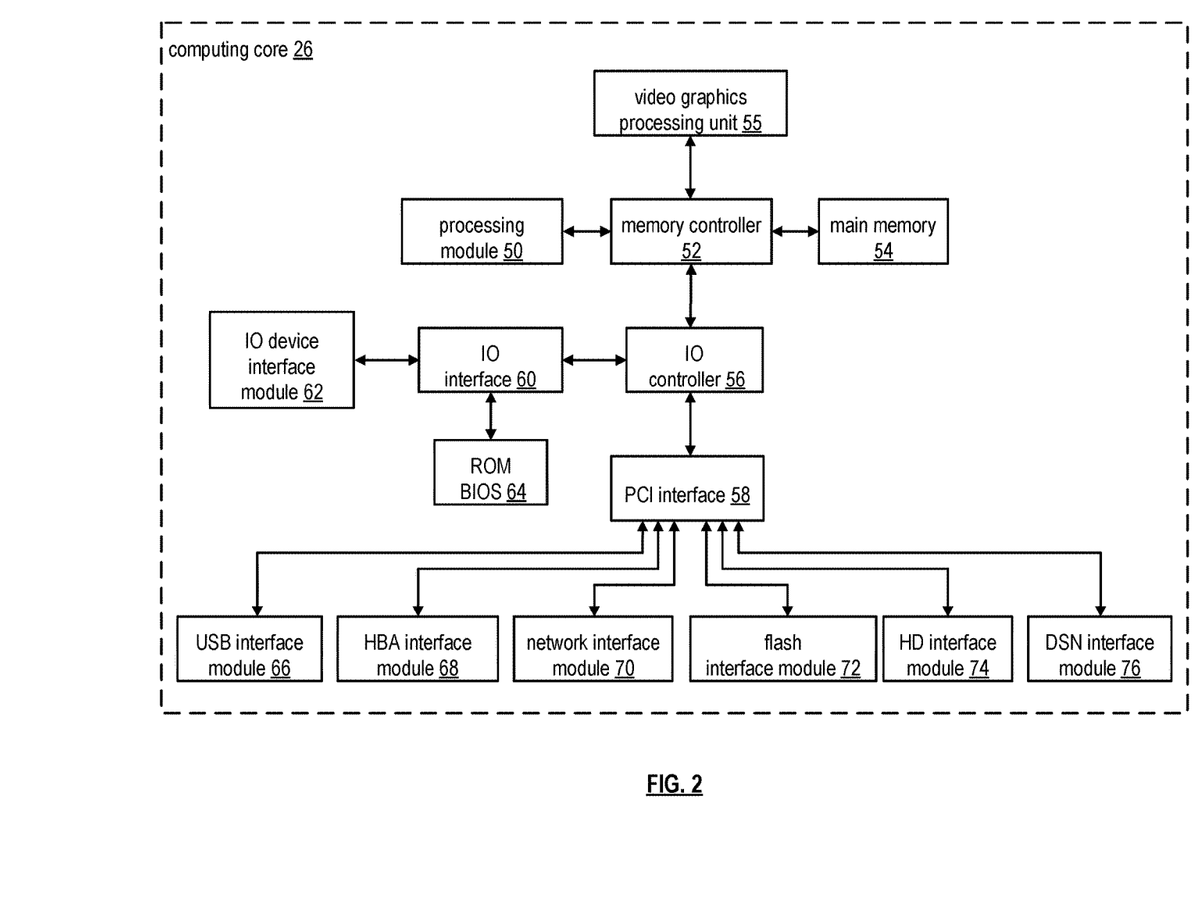
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
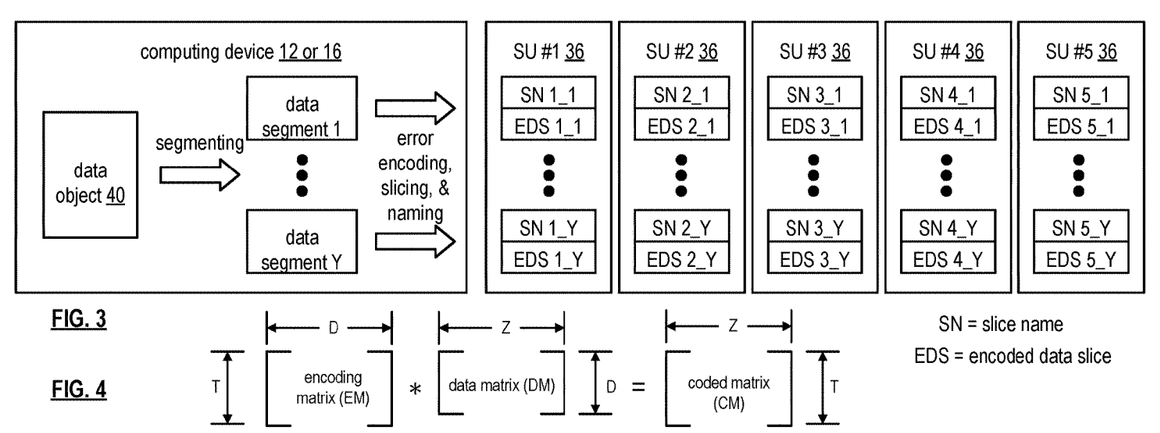
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
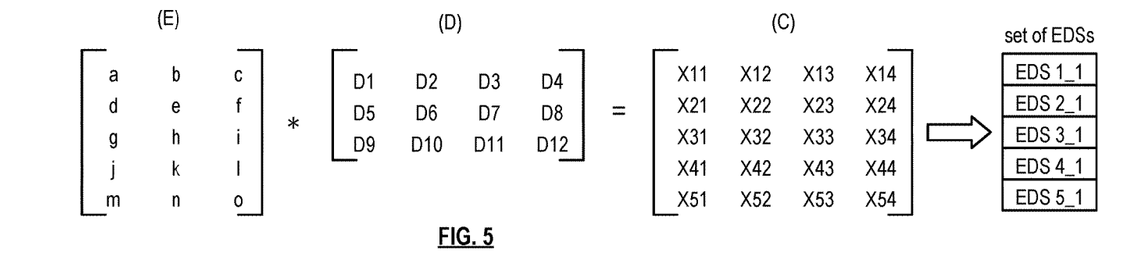
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
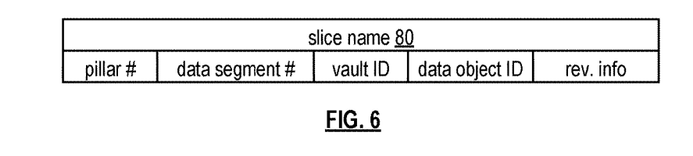
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
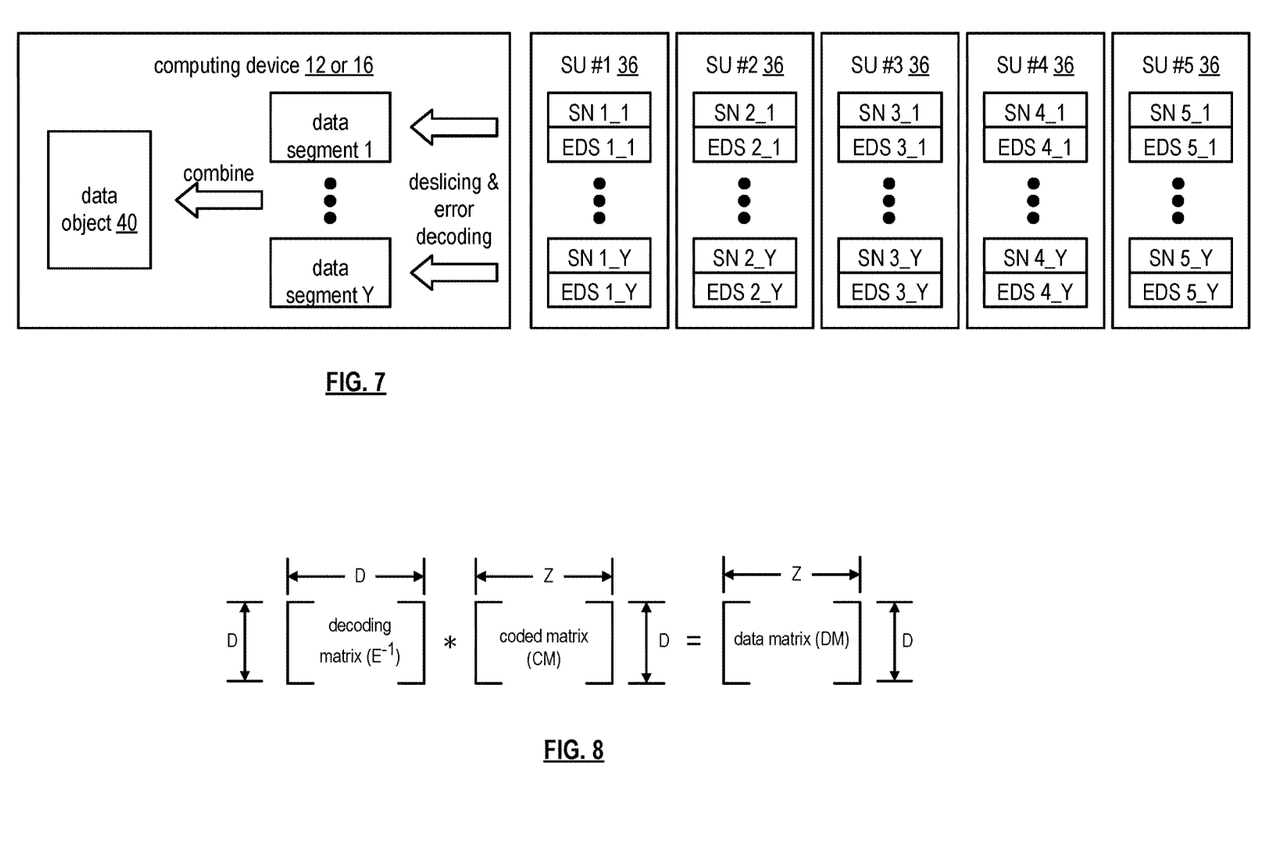
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
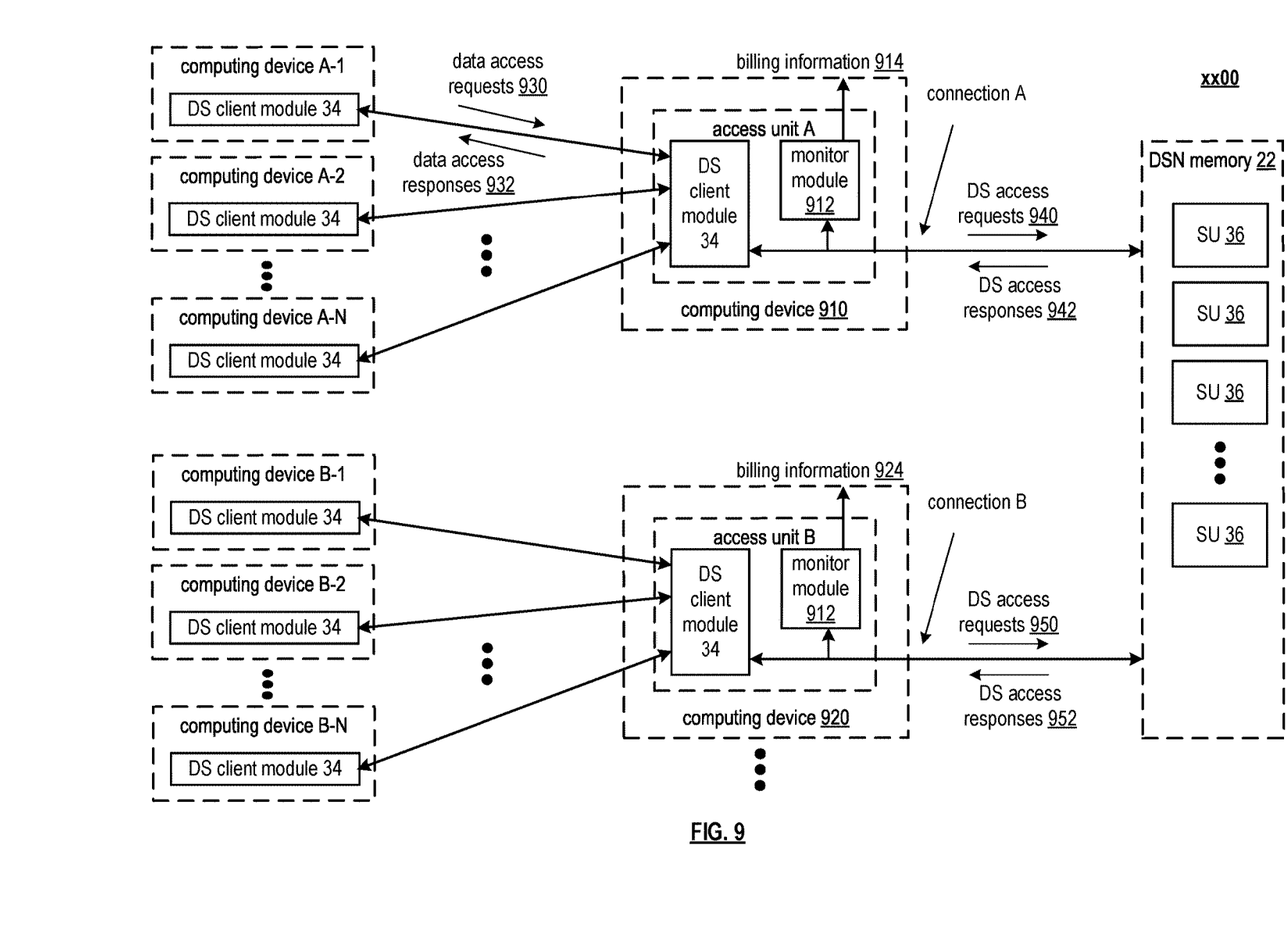
FIG. 9 is a schematic block diagram of an embodiment of a dispersed or distributed storage network (DSN) in accordance with the present invention.

FIG. 9 is a schematic block diagram 900 of an embodiment of a dispersed or distributed storage network (DSN) in accordance with the present invention. This diagram includes a schematic block diagram of an embodiment of a dispersed or distributed storage network (DSN) that includes the dispersed or distributed storage network (DSN) memory 22 of FIG. 1, two or more access units A-B, and a plurality of computing devices A-1 through A-N and B-1 through B-N. The DSN memory 22 includes a plurality of storage units (SUs) 36 of FIG. 1. Each access unit includes the DS client module 34 of FIG. 1 and a monitor module 912. Each computing device includes the DS client module 34 of FIG. 1. Each computing device may be implemented to include some or all of the components of the computing device, 12, 16, and/or 14 in some examples. Node that computing devices 910 and 920 may be implemented to includes some or all of the components of the computing device, 12, 16, and/or 14 in some examples in addition to monitor module 912 and be implemented respectively as access unit A and B.

A subgroup of the plurality of computing devices is affiliated with a corresponding access unit to enable accessing the DSN memory 22. As a specific example, computing devices A-1 through A-N are affiliated with access unit A (e.g., which may be implemented as computing device 910) and computing devices B-1 through B-N are affiliated with access unit B (e.g., which may be implemented as computing device 920). Each computing device utilizes a corresponding access unit to access the DSN memory 22. As a specific example, computing device A-2 issues data access requests 930 (e.g., write data request, a read data request, list data request, delete data request) to access unit A and receives data access responses 932 (e.g., write data response, read data response, list data response, delete data response) from Access unit A. Alternatively, or in addition to, the data access requests include one or more of write slice requests, read slice requests, list slice requests, and delete slice requests; and the data access responses includes one or more of write slice responses, read slice responses, list slice responses, and delete slice responses.

Each access unit maintains a corresponding connection with the DSN memory 22 to enable access to the DSN memory 22. Such a connection may be a physical and/or logical connection to enable, from time to time, transfer of messages. The connection may be bandwidth limited based on one or more of a predetermination, available bandwidth, a service level agreement, and an economic agreement. The connection may utilize a specific encryption to provide additional security between the corresponding access unit and the DSN memory 22. As a specific example, access unit A maintains connection A with the DSN memory 22 and sends dispersed storage (DS) access requests 940 (e.g., write slice requests, read slice requests, list slice requests, delete slice requests) to the DSN memory 22 via the connection A and receives DS access responses 942 (e.g., write slice responses, read slice responses, list slice responses, delete slice responses) from the DSN memory 22 via the connection A. As another specific example, access unit B maintains connection B with the DSN memory 22 and sends dispersed storage (DS) access requests 950 (e.g., write slice requests, read slice requests, list slice requests, delete slice requests) to the DSN memory 22 via the connection B and receives DS access responses 952 (e.g., write slice responses, read slice responses, list slice responses, delete slice responses) from the DSN memory 22 via the connection B.

In an example of operation, the DS client module 34 of the access unit A receives a data access request 930 from the DS client module 34 of computing device A-2. The DS client module 34 of the access unit A processes the data access request to generate a set of DS access requests 940 (e.g., a set of write slice request when the data access request is a write data request, a set of read slice requests when the data access request is a read data request). The DS client module 34 of the access unit A selects a connection associated with the computing device A-2 for connectivity to the DSN memory 22. For example, the DS client module 34 of the access unit A selects connection A based on a lookup of a table providing affiliation information of computing devices to connections.

Having generated the set of DS access requests 940, the DS client module 34 of the access unit A sends, via the connection A, the set of DS access requests 940 to a corresponding set of SUs 36 of the DSN memory 22. The monitor module 912 of the access unit A monitors the sending of the set of DS access requests 940 to produce utilization information associated with connection A (e.g., number of bytes sent, amount of bandwidth utilize, peak transfer speed, average transfer speed, encryption type utilized identity of the computing device A-2, etc.). The DS client module 34 of the access unit A receives, via the connection A, DS access responses 942 (e.g., write slice responses when the data access request is the write data request, read slice responses when the data access request is the read data request) from the DSN memory 22. The monitor module 912 of the access unit A monitors the receiving of the DS access responses to produce updated utilization information associated with connection A.

Having received the DS access response, the DS client module 34 of the access unit A issues a data access response 932 to the computing device A-2 based on the DS access responses 942 (e.g., a write data status response when the data request is the write data request, data when data request is the read data request). The monitor module 912 outputs one or more of the updated utilization information and billing information 914 that is generated based on the updated utilization information. The monitor module 912 generates the billing information 914 based on one or more of a level of billing, a billing rate, and the updated utilization information. As a specific example, the monitor module 912 multiplies bandwidth utilization information of the updated utilization information by multiple billing rates to produce the billing information 914 specifically for each individual computing device, a group of computing devices, and all computing devices. Note that the monitor module 912 of access unit B (e.g., which may be implemented as computing device 920) may also generate corresponding billing information 924.

In an example of operation and implementation, a computing device includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, a computing device includes such a processing module operably coupled to the interface and to the memory, wherein the processing module, when operable within the computing device based on the operational instructions, is configured to perform various operations. The computing device is configured to receive a data access request via the interface and from a requesting computing device of a subscriber group and process the data access request to produce a set of distributed storage (DS) access requests. The computing device is also configured to transmit the set of DS access requests via the interface and to a set of storage units (SUs) via a DSN connection that is between the computing device and the set of SUs. The computing device is also configured to monitor the DSN connection based on transmission of the set of DS access requests via the DSN connection to generate utilization information associated with the DSN connection. The computing device is configured to receive a set of DS access responses via the interface and from the set of SUs via the DSN connection and to monitor the DSN connection based on receipt of the set of DS access responses via the DSN connection to generate updated utilization information associated with the DSN connection. The computing device is also configured to transmit a data access response via the interface and to the requesting computing device of the subscriber group. The computing device is also configured to generate billing information based on the updated utilization information associated with the DSN connection, a level of billing, and/or a billing rate.

In some examples, note that a data object is segmented into a plurality of data segments, and a data segment of the plurality of data segments is dispersed error encoded in accordance with dispersed error encoding parameters to produce a set of encoded data slices (EDSs). A decode threshold number of EDSs are needed to recover the data segment, and a read threshold number of EDSs provides for reconstruction of the data segment. A write threshold number of EDSs provides for a successful transfer of the set of EDSs from a first at least one location in the DSN to a second at least one location in the DSN, the set of EDSs is of pillar width and includes a pillar number of EDSs. Also, in certain examples, each of the decode threshold number, the read threshold number, and the write threshold number is less than the pillar number. Also, in some examples, the write threshold number is greater than or equal to the read threshold number that is greater than or equal to the decode threshold number. Note that the data access request may correspond to a write request of the set of encoded EDSs associated with the data object to be distributedly stored among the set of SUs. Alternatively, note that the data access request may correspond to a read request of another set of EDSs associated with the data object that is distributedly stored among the set of SUs.

Also, in certain examples, note that the utilization information associated with the DSN connection includes number of bytes, amount of bandwidth utilize, peak transfer speed, average transfer speed, and/or encryption type utilized to identity of the requesting computing device of the subscriber group based on the transmission of the set of DS access requests via the DSN connection. Also, in some examples, the updated utilization information associated with the DSN connection includes number of bytes, amount of bandwidth utilize, peak transfer speed, and/or average transfer speed based on the receipt of the set of DS access responses via the DSN connection.

Such billing information may be generated in a number of ways. In some examples, the computing device is configured to multiply bandwidth utilization information of the updated utilization information by multiple billing rates to produce the billing information, wherein the billing information corresponds to each of a plurality of requesting computing devices of the subscriber group including the requesting computing device. In other examples, the computing device is configured to multiply an average amount of bandwidth by a cost per amount of utilized bandwidth for the subscriber group that includes the requesting computing device to generate the billing information for the subscriber group.

Note that the computing device may be located at a first premises that is remotely located from at least one SU of the set of SUs and is also remotely located from the requesting computing device of the subscriber group within the DSN. Also, note that the requesting computing device of the subscriber group may be implemented to include a wireless smart phone, a laptop, a tablet, a personal computers (PC), a work station, and/or a video game device.

Also, note that DSN may be implemented to include or be based on any of a number of different types of communication systems including a wireless communication system, a wire lined communication systems, a non-public intranet system, a public internet system, a local area network (LAN), or a wide area network (WAN).

Figure 10A:
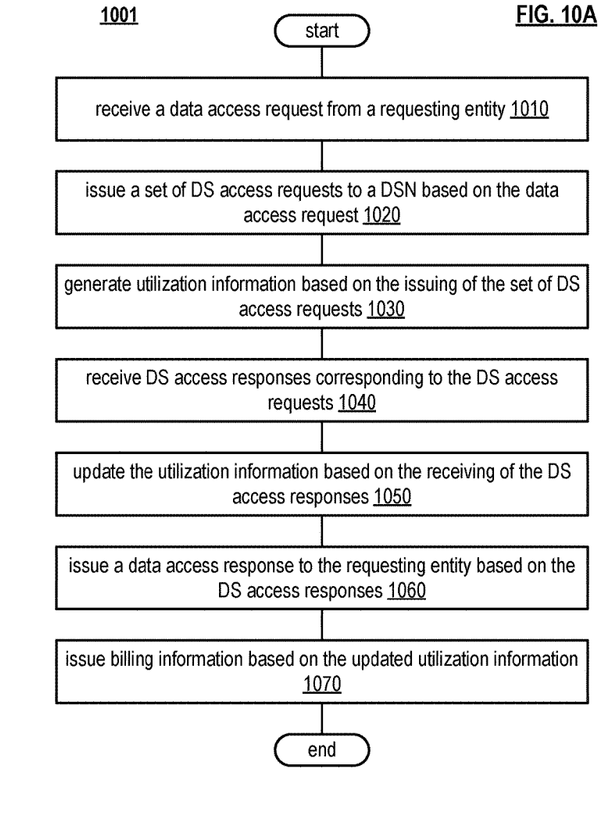
FIG. 10A is a flowchart illustrating an example of generating billing information in accordance with the present invention.

FIG. 10A is a flowchart illustrating an example of generating billing information in accordance with the present invention. This diagram includes a flowchart illustrating an example of generating billing information. The method 1001 begins at a step 1010 where a processing module (e.g., of a DS client module such as DS client module depicted with reference to FIG. 1) receives a data access request from a requesting entity. The receiving may include identifying a subscriber group that includes the requesting entity. The method 1001 continues at the step 1020 where the processing module issues a set of dispersed storage (DS) access requests to a dispersed storage network (DSN) based on the received data access request. As a specific example, the processing module generates a set of write slice requests when the data access request is a write data request, identifies a connection to the DSN associated with the requesting entity (e.g., a lookup, issuing a query, extracting from the data access request), and sends the set of write slice requests, via the connection, to the DSN.

The method 1001 continues at the step 1030 where the processing module generates utilization information based on the issuing of the set of DS access requests. As a specific example, the processing module monitors the sending of the set of DS access requests via the connection and generates the utilization information based on the monitoring. The method 1001 continues at the step 1040 where the processing module receives, via the connection, DS access responses corresponding to the DS access requests. As a specific example, the processing module receives write slice responses when the DS access requests includes the set of write slice requests. The method 1001 continues at the step 1050 where the processing module updates the utilization information based on the receiving of the DS access responses. As a specific example, the processing module further monitors the receiving of the DS access responses via the connection and generates updated utilization information based on the further monitoring.

The method 1001 continues at the step 1060 where the processing module issues a data access response to the requesting entity based on the DS access responses. As a specific example, the processing module generates a write data status response based on the received write slice responses and sends the write data status response to the requesting entity. The method 1001 continues at the step 1070 where the processing module issues billing information based on the updated utilization information. As a specific example, the processing module generates the billing information based on the updated utilization information, a billing rate, and a level of billing. For instance, the processing module multiplies an average amount of bandwidth by a cost per amount of utilized bandwidth for a particular user group to produce billing information for the user group.

Figure 10B:
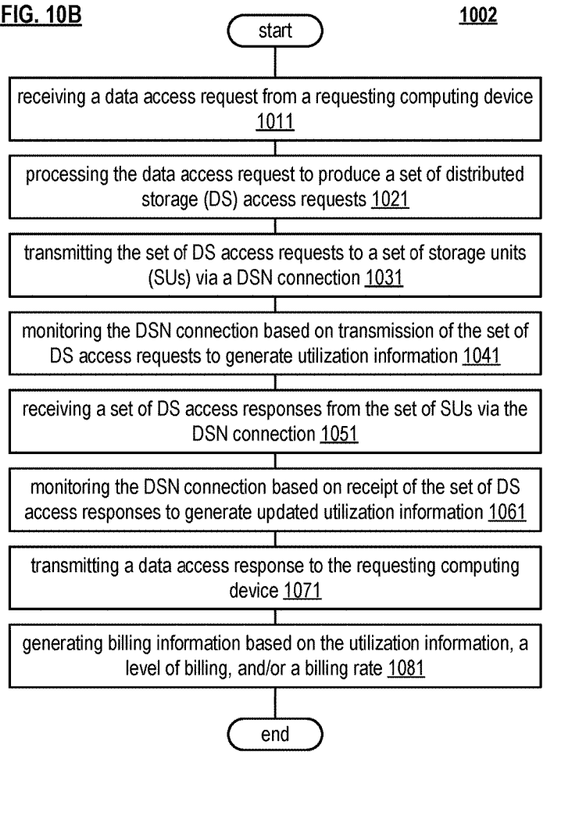
FIG. 10B is a diagram illustrating an embodiment of a method for execution by one or more computing devices in accordance with the present invention.

FIG. 10B is a diagram illustrating an embodiment of a method for execution by one or more computing devices in accordance with the present invention. The method 1002 operates at step 1011 by receiving a data access request (e.g., via an interface of the computing device that is configured to interface and communicate with a dispersed or distributed storage network (DSN)) from a requesting computing device of a subscriber group.

The method 1001 continues at the step 1021 by processing the data access request to produce a set of distributed storage (DS) access requests. The method 1001 continues at the step 1031 by transmitting the set of DS access requests (e.g., via the interface) to a set of storage units (SUs) via a DSN connection that is between the computing device and the set of SUs. The method 1001 continues at the step 1041 by monitoring the DSN connection based on transmission of the set of DS access requests via the DSN connection to generate utilization information associated with the DSN connection.

The method 1001 continues at the step 1051 by receiving a set of DS access responses via the interface and from the set of SUs via the DSN connection, and the method 1001 continues at the step 1061 by monitoring the DSN connection based on receipt of the set of DS access responses via the DSN connection to generate updated utilization information associated with the DSN connection.

The method 1001 continues at the step 1061 by transmitting a data access response (e.g., via the interface) to the requesting computing device of the subscriber group. The method 1001 continues at the step 1081 by generating billing information based on the updated utilization information associated with the DSN connection, a level of billing, and/or a billing rate.

Such billing information may be generated in a number of ways. In some examples, a variant of the method 1002 operates by multiplying bandwidth utilization information of the updated utilization information by multiple billing rates to produce the billing information, wherein the billing information corresponds to each of a plurality of requesting computing devices of the subscriber group including the requesting computing device. In certain examples, another variant of the method 1002 operates by multiplying an average amount of bandwidth by a cost per amount of utilized bandwidth for the subscriber group that includes the requesting computing device to generate the billing information for the subscriber group.

This disclosure presents, among other things, various examples of operations that may be performed by an appropriately configured computing device. One example includes a computing device (e.g., an access unit) that interacts with and supports communications between a DSN memory 22 that includes storage units (SUs) 36 and various respective computing devices (e.g., A-1 through A-N). For example, the DSN memory 22 is supported by the cost of renting a "pipe" (e.g., a connection between the computing device (e.g., an access unit) and the DSN memory with certain throughput limits) to that DSN memory 22 rather than by the cost of data specifically stored from specific users. For example, the amount of data that can be stored is throttled by the connection limitations of the pipe itself. This setup may be applied in situations where the computing devices (e.g., access units or alternatively referred to as accessers) and/or the data accessed thereby is anonymous. As such no specific tracking is performed based on which specific data belongs to which specific users as in "Secure shared vault with encrypted private indices" and other shared or public DSN memories.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
receive a data access request via the interface and from a requesting computing device of a subscriber group;
process the data access request to produce a set of distributed storage (DS) access requests;
transmit the set of DS access requests via the interface and to a set of storage units (SUs) via a DSN connection that is between the computing device and the set of SUs;
monitor the DSN connection based on transmission of the set of DS access requests via the DSN connection to generate utilization information associated with the DSN connection;
receive a set of DS access responses via the interface and from the set of SUs via the DSN connection;
monitor the DSN connection based on receipt of the set of DS access responses via the DSN connection to generate updated utilization information associated with the DSN connection;
transmit a data access response via the interface and to the requesting computing device of the subscriber group; and
generate billing information based on at least one of the updated utilization information associated with the DSN connection, a level of billing, or a billing rate.

2. The computing device of claim 1, wherein:
a data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, wherein the set of EDSs is of pillar width and includes a pillar number of EDSs, wherein each of the decode threshold number, the read threshold number, and the write threshold number is less than the pillar number, and wherein the write threshold number is greater than or equal to the read threshold number that is greater than or equal to the decode threshold number; and
the data access request corresponds to a write request of the set of encoded EDSs associated with the data object to be distributedly stored among the set of SUs; or
the data access request corresponds to a read request of another set of EDSs associated with the data object that is distributedly stored among the set of SUs.

3. The computing device of claim 1, wherein:
the utilization information associated with the DSN connection includes at least one of number of bytes, amount of bandwidth utilize, peak transfer speed, average transfer speed, or encryption type utilized to identity of the requesting computing device of the subscriber group based on the transmission of the set of DS access requests via the DSN connection; and
the updated utilization information associated with the DSN connection includes at least one of number of bytes, amount of bandwidth utilize, peak transfer speed, or average transfer speed based on the receipt of the set of DS access responses via the DSN connection.

4. The computing device of claim 1, wherein the processing module, when operable within the computing device based on the operational instructions, is further configured to:
multiply bandwidth utilization information of the updated utilization information by multiple billing rates to produce the billing information, wherein the billing information corresponds to each of a plurality of requesting computing devices of the subscriber group including the requesting computing device.

5. The computing device of claim 1, wherein the processing module, when operable within the computing device based on the operational instructions, is further configured to:
multiply an average amount of bandwidth by a cost per amount of utilized bandwidth for the subscriber group that includes the requesting computing device to generate the billing information for the subscriber group.

6. The computing device of claim 1, wherein the computing device is located at a first premises that is remotely located from at least one SU of the set of SUs and is also remotely located from the requesting computing device of the subscriber group within the DSN.

7. The computing device of claim 1, wherein the requesting computing device of the subscriber group includes a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:
receive a data access request via the interface and from a requesting computing device of a subscriber group;
process the data access request to produce a set of distributed storage (DS) access requests;
transmit the set of DS access requests via the interface and to a set of storage units (SUs) via a DSN connection that is between the computing device and the set of SUs;
monitor the DSN connection based on transmission of the set of DS access requests via the DSN connection to generate utilization information associated with the DSN connection that includes at least one of number of bytes, amount of bandwidth utilize, peak transfer speed, average transfer speed, or encryption type utilized to identity of the requesting computing device of the subscriber group based on the transmission of the set of DS access requests via the DSN connection;
receive a set of DS access responses via the interface and from the set of SUs via the DSN connection;
monitor the DSN connection based on receipt of the set of DS access responses via the DSN connection to generate updated utilization information associated with the DSN connection that includes at least one of number of bytes, amount of bandwidth utilize, peak transfer speed, or average transfer speed based on the receipt of the set of DS access responses via the DSN connection;
transmit a data access response via the interface and to the requesting computing device of the subscriber group; and
generate billing information based on at least one of the updated utilization information associated with the DSN connection, a level of billing, or a billing rate including to multiply an average amount of bandwidth by a cost per amount of utilized bandwidth for the subscriber group that includes the requesting computing device to generate the billing information for the subscriber group.

10. The computing device of claim 9, wherein:
a data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, wherein the set of EDSs is of pillar width and includes a pillar number of EDSs, wherein each of the decode threshold number, the read threshold number, and the write threshold number is less than the pillar number, and wherein the write threshold number is greater than or equal to the read threshold number that is greater than or equal to the decode threshold number; and
the data access request corresponds to a write request of the set of encoded EDSs associated with the data object to be distributedly stored among the set of SUs; or
the data access request corresponds to a read request of another set of EDSs associated with the data object that is distributedly stored among the set of SUs.

11. The computing device of claim 9, wherein the processing module, when operable within the computing device based on the operational instructions, is further configured to:
multiply bandwidth utilization information of the updated utilization information by multiple billing rates to produce the billing information, wherein the billing information corresponds to each of a plurality of requesting computing devices of the subscriber group including the requesting computing device.

12. The computing device of claim 9, wherein the requesting computing device of the subscriber group includes a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:
receiving a data access request via an interface of the computing device that is configured to interface and communicate with a dispersed or distributed storage network (DSN) and from a requesting computing device of a subscriber group;
processing the data access request to produce a set of distributed storage (DS) access requests;
transmitting the set of DS access requests via the interface and to a set of storage units (SUs) via a DSN connection that is between the computing device and the set of SUs;
monitoring the DSN connection based on transmission of the set of DS access requests via the DSN connection to generate utilization information associated with the DSN connection;
receiving a set of DS access responses via the interface and from the set of SUs via the DSN connection;
monitoring the DSN connection based on receipt of the set of DS access responses via the DSN connection to generate updated utilization information associated with the DSN connection;
transmitting a data access response via the interface and to the requesting computing device of the subscriber group; and
generating billing information based on at least one of the updated utilization information associated with the DSN connection, a level of billing, or a billing rate.

15. The method of claim 14, wherein:
a data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, wherein the set of EDSs is of pillar width and includes a pillar number of EDSs, wherein each of the decode threshold number, the read threshold number, and the write threshold number is less than the pillar number, and wherein the write threshold number is greater than or equal to the read threshold number that is greater than or equal to the decode threshold number; and
the data access request corresponds to a write request of the set of encoded EDSs associated with the data object to be distributedly stored among the set of SUs; or
the data access request corresponds to a read request of another set of EDSs associated with the data object that is distributedly stored among the set of SUs.

16. The method of claim 14, wherein:
the utilization information associated with the DSN connection includes at least one of number of bytes, amount of bandwidth utilize, peak transfer speed, average transfer speed, or encryption type utilized to identity of the requesting computing device of the subscriber group based on the transmission of the set of DS access requests via the DSN connection; and
the updated utilization information associated with the DSN connection includes at least one of number of bytes, amount of bandwidth utilize, peak transfer speed, or average transfer speed based on the receipt of the set of DS access responses via the DSN connection.

17. The method of claim 14 further comprising:
multiplying bandwidth utilization information of the updated utilization information by multiple billing rates to produce the billing information, wherein the billing information corresponds to each of a plurality of requesting computing devices of the subscriber group including the requesting computing device.

18. The method of claim 14 further comprising:
multiplying an average amount of bandwidth by a cost per amount of utilized bandwidth for the subscriber group that includes the requesting computing device to generate the billing information for the subscriber group.

19. The method of claim 14, wherein the requesting computing device of the subscriber group includes a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *